United States Patent [19]
Brown et al.

[11] Patent Number: 4,883,782
[45] Date of Patent: Nov. 28, 1989

[54] COBALT-MOLYBDENUM THIN FILM CATALYST

[75] Inventors: James R. Brown, Kanata; Norman S. McIntyre, London; Darlene D. Johnston, Komoka, all of Canada

[73] Assignee: Energy, Mines and Resources-Canada, Ottawa, Canada

[21] Appl. No.: 215,295

[22] Filed: Jul. 5, 1988

[51] Int. Cl.$^4$ .................... B01J 27/049; B01J 27/051
[52] U.S. Cl. ................... 502/220; 502/221; 502/527; 208/209
[58] Field of Search .......... 502/220, 221, 527

[56] References Cited

U.S. PATENT DOCUMENTS

| | | | |
|---|---|---|---|
| 3,362,783 | 1/1968 | Leak | 23/2 |
| 3,907,708 | 9/1975 | Lacroix | 502/221 |
| 4,121,909 | 10/1978 | Cronauer | 422/222 |
| 4,279,782 | 7/1981 | Chapman et al. | 502/527 |
| 4,294,685 | 10/1981 | Kim et al. | 208/10 |
| 4,465,789 | 8/1984 | Lindsley | 502/527 |
| 4,591,429 | 5/1986 | Ho et al. | 502/221 |
| 4,626,339 | 12/1986 | Chianelli et al. | 502/221 |

FOREIGN PATENT DOCUMENTS 0158392 12/1979 Japan .................... 502/220

Primary Examiner—H. M. S. Sneed
Assistant Examiner—E. D. Irzinski

[57] ABSTRACT

A thin film catalyst structure is described for use in hydrodesulphurization of gaseous hydrocarbon mixtures. The catalyst is formed starting with an aluminum substrate having an oxide surface layer and thin films of metallic cobalt and molybdenum are sequentially deposited on the aluminum oxide layer. The films of metallic cobalt and molybdenum are calcined and then reduced and sulphided to form a sulphided thin film catalyst structure having improved hydrodesulphurization properties.

7 Claims, No Drawings

10
COBALT-MOLYBDENUM THIN FILM CATALYST

BACKGROUND OF THE INVENTION

This invention relates to a method of and a catalyst for hydrodesulphurization of gaseous hydrocarbon mixtures.

It is well-known to use a catalyst in the reduction of organic sulphur compounds contained in hydrocarbon feedstocks. A typical catalyst for this purpose is an alumina-supported cobalt-molybdenum oxide catalyst. Typically, the catalyst has been prepared by co-precipitating cobalt, molybdenum and aluminum salts from solution to form a structure where the cobalt and molybdenum oxides are distributed across the surface of the alumina particles. After activation by reduction and sulphidization, the important surface structure is believed to be a mixed cobalt-molybdenum sulphide supported on alumina.

When this structure is prepared by precipitation, it appears that the active form is generated almost haphazardly because of a wide variance in the distribution of molybdenum and cobalt oxides. This means that the active supported Co—Mo—S structure has a relatively low probability of forming.

Another form of alumina supported catalyst is described in Leak, U.S. Pat. No. 3,362,783, in which an adherent film of alumina is formed on a metal substrate and an oxidation catalyst is deposited on the alumina. The catalyst, which may include cobalt and molybdenum, is deposited by impregnation from a solution.

It is the object of this invention to develop a cobalt-molybdenum catalyst of improved efficiency because of improved surface characteristics.

SUMMARY OF THE INVENTION

The actual catalytic promotion occurs only at the top atomic layer of catalysts, and it has been found according to this invention that a more reproducible, and therefore a more efficient surface can be formed by developing the Co—Mo—Al sulphide as a thin film structure with the active cobalt and molybdenum species at or near the outer surface. This provides greater uniformity of molecular structure and therefore a much greater density of active sites where catalytic exchange can occur.

The catalyst structure of this invention consists of an aluminum substrate which is oxidized to produce a surface layer of aluminum oxide. Subsequently, layers of metallic cobalt and molybdenum are sequentially deposited onto the aluminum oxide layer. These Co and Mo layers are then oxidized or calcined at elevated temperatures in air to produce precursor oxides suitable for the formation of the Co—Mo—S active species. These oxides are $Co_3O_4$ and a range of molybdenum oxides, $MoO_{3-x}$ where $0<x<1$. The thin film structure is then reduced and sulphided.

The aluminum oxide layer preferably has a thickness of about 50 to 500 Å and is normally applied to a polished aluminum metal or aluminum foil substrate, although it is also possible to use a porous aluminum support. The films of metallic cobalt and molybdenum preferably have thicknesses in the range of 20-50 Å and these films are deposited by methods which will result in a layer of metal, e.g. ion beam techniques such as sputtering, vapour deposition, electrochemical deposition, etc. The oxidation or calcination is typically carried out at a temperature of about 300°-500° C. in air for a time of from a few minutes to several hours. The metal oxides formed are reduced and sulphided preferably in a $H_2/10\%$ $H_2S$ flowing gas mixture at ambient pressure, preferably at a temperature of about 250°-350° C. for about 30 to 90 minutes.

The aluminum substrate preferably should be as smooth as possible for best results. However, the substrate may contain large pores which are sufficiently large that the interior faces of the pores can be covered with an oxide layer of uniform thickness and cobalt and molybdenum films of uniform thickness without filling the pores with oxide or metals.

In the following examples, which further illustrate this invention, catalytic structures were prepared and were evaluated for use as hydrodesulphurization catalysts.

EXAMPLE 1

Samples of polished aluminum metal were oxidized to produce a surface layer of about 100 Å of aluminum oxide. Subsequently, 50-500 Å layers of metallic molybdenum and/or cobalt were deposited by ion beam techniques onto the aluminum oxide. In this manner there were produced (1) samples with a layer of cobalt, (2) samples with sequentially deposited layers of molybdenum and cobalt and (3) samples with a mixed layer of molybdenum and cobalt. These layers were then calcined at 300°-500° C. in air for 1 hour to produce precursor oxides suitable for the formation of Co—Mo—S active species. The thin film structure was then reduced and sulphided in an $H_2/10\%$ $H_2S$ flowing gas mixture at an ambient pressure and 350° C. for 60 minutes.

Samples of sulphided thin film structures having a normal surface area of 1 cm² were heated by reaction with a static mixture of 1,000 ppm (A/A) thiophene ($C_4H_4S$) in hydrogen at 350° C. and at pressures ranging from 1-10 atmospheres. Reaction times varied from 1 to 6 hours and the thiophene conversions were measured by gas chromatographic analysis of the mixture following reaction. For comparison, a sample of commercial cobalt-molybdenum catalyst powder having a surface area of 44 m² as determined by the BET surface area measurement technique was tested under the same conditions. The testing conditions and results obtained are shown in the following Table 1.

TABLE 1

| GAS COMPOSITION (VOL. %) | CATALYST TYPE | | | | | |
|---|---|---|---|---|---|---|
| | SERIES 1 | SERIES 2 | | SERIES 3 | REFERENCE* | |
| | (1 HR) | (1 HR) | (6 HR) | (1 HR) | (1 HR) | (6 HR) |
| $H_2$ | 99.262 | 99.073 | 99.197 | 99.390 | 99.273 | 99.432 |
| $C_4H_4S$ | 0.401 | 0.467 | 0.407 | 0.533 | 0.490 | 0.205 |
| $H_2S$ | 0.311 | 0.415 | 0.230 | 0.008 | — | — |
| BUTANE | 0.014 | 0.022 | 0.085 | 0.009 | 0.221 | 0.313 |
| ISO AND 1-BUTENE | 0.005 | 0.008 | 0.016 | 0.011 | 0.001 | TRACE |
| TRANS 2-BUTENE | 0.004 | 0.009 | 0.024 | 0.011 | 0.003 | 0.001 |

TABLE 1-continued

| GAS COMPOSITION (VOL. %) | CATALYST TYPE | | | | | |
|---|---|---|---|---|---|---|
| | SERIES 1 (1 HR) | SERIES 2 (1 HR) | SERIES 2 (6 HR) | SERIES 3 (1 HR) | REFERENCE* (1 HR) | REFERENCE* (6 HR) |
| CIS 2-BUTENE | 0.003 | 0.006 | 0.017 | 0.008 | 0.002 | TRACE |
| ETHANE | — | — | 0.018 | — | 0.010 | 0.017 |
| N-PENTANE | — | — | — | — | — | 0.001 |
| ISO-PENTANE | — | — | — | — | — | 0.002 |
| ISO-BUTANE | — | — | — | — | — | — |
| PROPANE | — | — | — | 0.030 | — | 0.003 |
| METHANE | — | — | 0.016 | — | — | 0.011 |
| THIOPHENE CONVERSION (%) | | | | | | |
| (A)WITH CATALYST | 6.3 | 9.6 | 29.0 | 11.5 | 32.6 | 64.0 |
| (B)WITHOUT CATALYST | 6.1 | 5.2 | 12.3 | 4.4 | 5.2 | 12.3 |
| NET CONVERSION | 0.2 | 4.4 | 16.7 | 7.1 | 27.4 | 51.7 |
| Co/Mo | — | 0.6 | 0.5 | 0.9 | 0.5 | 0.33 |

*Commercial cobalt-molybdenum catalyst (Harshaw HT 400)

The above table shows that with the catalyst of this invention, after a reaction time of 1 hour, 5-7% of the thiophene was converted to hydrocarbons (largely 2-butene), after allowing for conversion by the reactor walls. Reaction for 6 hours resulted in conversion of 17% of the thiophene. The commercial catalyst powder gave a thiophene conversion after 1 hour of 27% and a conversion after 6 hours of 52%. While this conversion is higher in absolute terms than for the thin film specimens, in terms of surface area, thin film conversion is much greater.

We claim:

1. A thin film catalyst structure comprising:
   (a) an aluminum base having an oxidized surface layer thereon, and
   (b) sequentially deposited thin films of metallic cobalt and molybdenum on said oxidized layer, said cobalt and molybdenum films having been calcined and sulphided to thereby form catalytically active Co—Mo—S species at the outer surface of the catalyst.

2. A catalyst according to claim 1 wherein the films of cobalt and molybdenum have thicknesses in the range of 3-10 nm.

3. A catalyst according to claim 1 wherein the aluminum base is polished aluminum metal or aluminum foil.

4. A process for preparing a catalyst structure for use in hydrodesulphurization of gaseous hydrocarbon mixtures which comprises:
   (a) forming an oxide surface layer on an aluminum substrate,
   (b) sequentially depositing layers of metallic cobalt and molybdenum onto the aluminum oxide,
   (c) calcining the cobalt and molybdenum layers, and
   (d) sulphiding the calcined layers to form catalytically active Co—Mo—S species at the outer surface of the catalyst.

5. A process according to claim 4 wherein the aluminum oxide layer has as thickness of 50 to 500 Å.

6. A process according to claim 5 wherein the layers of metallic cobalt and molybdenum have thicknesses in the range of 20-50 Å.

7. A process according to claim 6 wherein the calcining is carried out at temperatures in the range of 300°-500° C.

* * * * *